United States Patent Office 3,045,104
Patented July 17, 1962

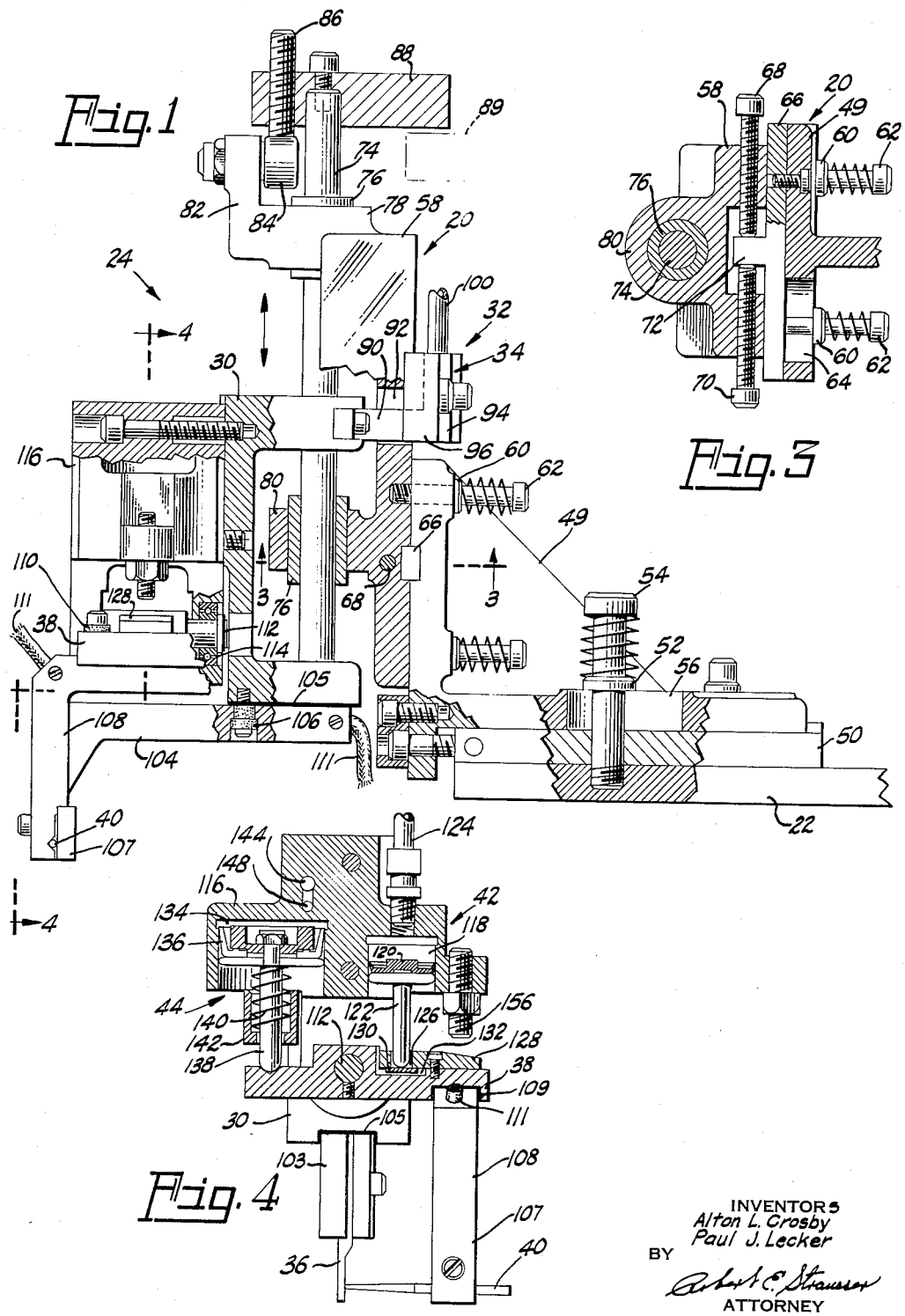

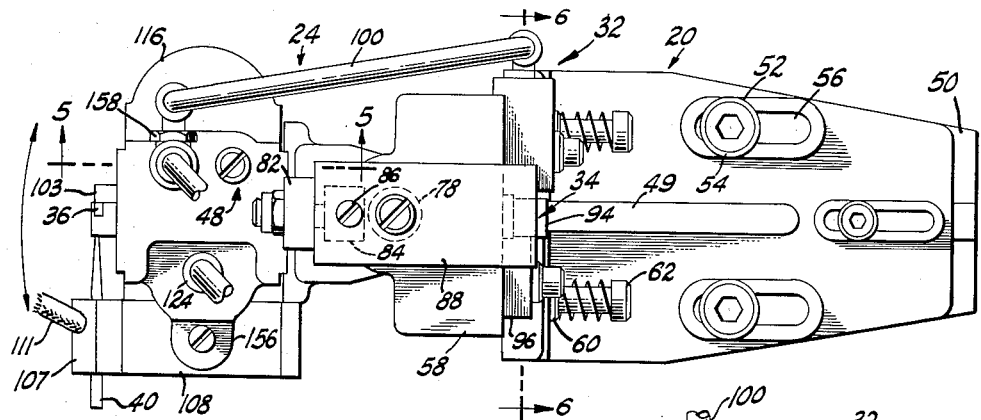
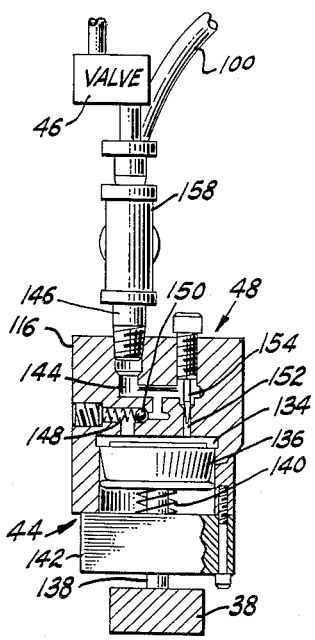
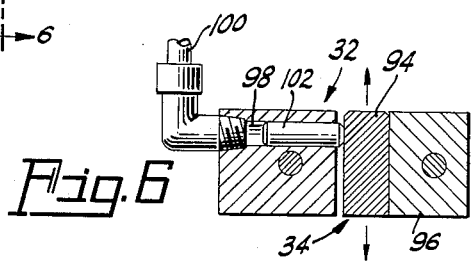
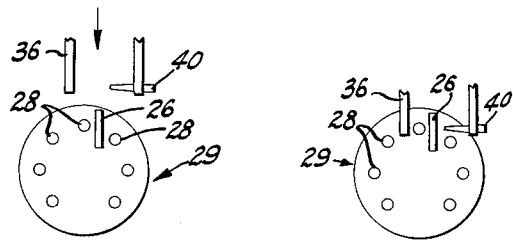
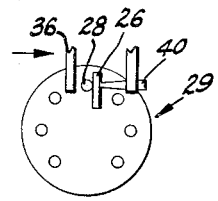
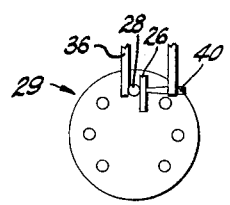

3,045,104
WELDING APPARATUS
Alton L. Crosby, Austin, and Paul J. Lecker, St. Marys, Pa., assignors to Sylvania Electric Products Inc., a corporation of Delaware
Filed Apr. 4, 1960, Ser. No. 19,828
8 Claims. (Cl. 219—86)

This invention relates to welding apparatus and more particularly to apparatus useful in the production of electron discharge devices for securing the electrodes to lead-in pins.

Electron discharge devices generally comprise an envelope which contains an electrode structure joined to connecting pins passing through the wall of the envelope. In the more common electron discharge devices, such as radio tubes, the leadin or connecting pins are molded into a glass insulating wafer to form a stem. The pins are arranged about the periphery of the wafer in a pattern which is varied according to the tube size or type. The leads are substantially parallel to one another on what will be the exterior side of the stem and are formed on the interior side to correspond to the position of the electrode to which they are to be joined.

The precision manufacture of stems and assembly of the individual electrodes into self supporting groups or mounts has been mechanized to a large degree. However, heretofore, the joining of the stem to the mount has been largely a manual operation. Use of prior art welding apparatus with a fixed head having a fixed welding electrode and a relatively movable welding electrode was not satisfactory because of the inherent variations in lead or electrode position which are a necessary part of the mass production of tube parts due to manufacturing and assembly tolerances. In the prior apparatus, both previously aligned parts were forcibly moved to the welding position by the electrodes, thus distorting them, rather than having the electrodes free to move to the position of the parts. Distortion also occurred when welding heads provided with "self-centering" electrodes were employed. The difference between the mass of the parts, electrodes, and electrode supports, resulted, again, in the parts being moved rather than the electrodes accommodating themselves to the parts' position. While an operator could compensate for spacing variations, it was not, prior to this invention, economically feasible to provide a machine capable of this function. Therefore, it is an object of this invention to provide a welding apparatus capable of self adjustment, within usable limits, to compensate for the positional variations of the articles to be secured together without causing deleterious distortion of the parts.

Manual operations for joining the parts were tedious and highly fatiguing due to the smallness of the electrodes and leads and the close spacing between adjacent connections. This combination of circumstances resulted in the production of defective assemblies. Assemblies were rejected because of missed or improper welds, distorted or damaged electrode structures and the like. Accordingly, it is another object of this invention to reduce operator fatigue and to reduce consequent assembly rejections to a minimum. It is yet another object of this invention to reduce the number of rejected electrode mount-stem assemblies due to improper welds.

Further, in another known manual method, the operator grasped the parts to be welded between the jaws of a hand held welding head. The determination of weld position and of the relative position of the parts were made by the operator. Considerable weld variations were found in samples produced by different operators and even by the same operator. These variations affected the characteristics of the finished tubes due to changes in the space relation of the electrodes and leads. It is yet another object of this invention to diminish the tube to tube variations attributable to the manner in which the mount is joined to the stem.

It was necessary in both of the methods discussed above to utilize skilled operators having a high degree of manual dexterity and a considerable amount of experience. The costly production of experienced operators resulted in the manufacture of certain tube types being economically unfeasible. A further object of this invention is to increase the production rate of mount and stem assemblies. Yet another object of the invention is to enable quantity production of precision assemblies to be produced by relatively untrained operators and thus lower production costs.

The foregoing objects are achieved in one aspect of the invention by the provision of a welding head which may pivot on a support to position the welding electrodes relative to the parts to be joined. The head may be selectively restrained from pivoting by a locking means mounted on the support. The head includes a frame on which is mounted a fixed welding electrode, a pivoted lever arm bearing a cooperating second welding electrode, first means to cause the welding electrodes to approach each other and second means for overcoming the first means and separating the electrodes. Operating means are provided which interconnect the second means and the welding head locking means together with means for controlling the sequence in which they operate so that the welding head is freed for pivotal movement on the support before the electrodes are closed together. In this manner the electrodes are allowed to position themselves relative to the parts rather than forcing the parts to a fixed electrode position.

For a better understanding of the invention, reference is made to the following description taken in conjunction with the accompanying drawings in which:

FIG. 1 is a side view in partial section of the welding head and mount;

FIG. 2 is a plan view of the welding head;

FIG. 3 is a view taken along line 3—3 of FIG. 1;

FIG. 4 is a partial front sectional view of the welding head taken along the line 4—4 of FIG. 1;

FIG. 5 is a side view in section taken along line 5—5 of FIG. 2;

FIG. 6 is an elevation in section taken along line 6—6 of FIG. 2, and

FIGS. 7, 8, 9 and 10 are diagrammatic depictations of the movements of the welding electrodes relative to the parts to be joined.

Referring to the drawings, the welder support 20 is shown mounted on a fragment of an assembly machine frame 22. This assembly machine utilizes a plurality of welding heads 24 of the type to be described for securing the connecting portions 26 of pre-assembled electrode groups or mounts to the leads 28 of pre-formed stems 29. Stems 29 and electrode structures (only a segment of one electrode connecting portion or tab 26 is shown in FIGS. 7 through 10 for purposes of clarity) to be welded are positioned horizontally, vertically, laterally, and angularly by an indexible positioning chuck such as that disclosed in application S.N. 19,838, Article Handling Apparatus, filed concurrently herewith, which is assigned to the same assignee as the present invention. Welding head 24 includes a frame 30 mounted on the support 20 for reciprocating and pivotal movement. Locking means 32, also mounted on the support 20, cooperates with a frame mounted key 34, when energized, to restrain the pivotal movement of the head 24. Welding head frame 30 carries a fixed welding electrode 36, pivoted lever arm 38 bearing cooperating welding electrode 40, first means or fluid motor 42 to cause electrodes 36 and 40 to approach each other and second means or fluid motor 44 for overcoming the first motor 42 and separating the electrodes. Operating means 46 are provided interconnecting the second motor 44 and the locking means 32. Sequence controlling means 48 controls the sequence in which the second motor and the frame lock 32 operate so that the head 24 is freed for pivotal movement on support 20 before the electrodes are closed together by the immediate release of the lock and the controlled relaxation of the second motor 44.

Referring to FIGS. 1 and 2 the support 20 includes an angular portion 49 adjustably carried on a keyed base 50 secured to the machine frame 22. Support 20 is kept against the base by spring loaded members 52 which are positioned about frame connected bolts 54 that pass through slots 56 in the support. This construction allows vertical movement of the entire apparatus if the electrodes 36, 40 should become jammed against a work piece. This is necessary to prevent extensive damage to the welder when employed in conjunction with an indexible turret carrying a plurality of workpieces in sequence to the welder.

Support arm 58 is resiliently secured to support 20 by spring loaded members 60 about bolts 62 passing through slots 64 in angle portion 49 (FIG. 3). This construction provides for outward movement of the head 24 if a jam should occur. The position of arm 58 on support 20 is determined by fixed key 66 fastened to support 20. Opposing bolts 68, 70, threaded in arm 58 bear against projection 72 on key 66 for purposes of adjustment. Shaft 74, upon which the head 24 is mounted, is slidably carried by bearings 76 fixed in bosses 78, 80 of support arm 58. Arm 82, an extension of boss 78, carries roller 84. Roller 84 cooperates with adjustable stop 86, threadedly engaged with the lift plate 88 secured to one end of shaft 74, to limit the downward movement of the shaft. Reciprocation of shaft 74 is provided by an arm 89 shown in phantom in FIG. 1, which contacts lift plate 88 at timed intervals as will be later explained.

Welding head frame 30 is affixed to shaft 74, for movement therewith, by a portion of key 34. Key 34 is substantially L-shaped with a horizontal leg 90 passing through slot 92 in support arm 58. Vertical leg 94 extends between block 96 and locking means 32 (FIGS. 1, 2 and 6). Block 96 and lock 32 are affixed to support arm 58. Referring particularly to FIG. 6, lock 32 includes a bore 98 which is connectable to a source of fluid pressure, not shown, by conduit 100. Dowel pin 102 is slidable within bore 98 and is adapted to contact the vertical leg 94 of key 34 when fluid pressure is admitted to the bore. Regulation of the fluid pressure applied allows the key to be moved into contact with block 96 by pin 102 while still allowing the key to slide between the pin and the block, thus inhibiting pivotal movement of the shaft but allowing axial movement. Key 34 may be likened to a feather key which is used to prevent relative rotation of a gear and shaft while allowing axial movement therebetween.

Fixed welding electrode 36 is held by clamp 103 on arm 104. Spacer 105 and bushings 106 insulate the arm from the frame 30. Movable electrode 40 is similarly held by clamp 107 in arm 108 which is insulated by similar spacer 109 and bushings 110 from pivoted lever arm 38. Welding current is brought to the electrodes by highly flexible conductors 111, from a source not shown. Lever arm 38 is attached to shaft 112, rotatably supported by bearings 114, in cylinder block 116. Cylinder block 116 is, in turn, fastened to the welding frame 30.

Adverting to FIG. 4, first fluid motor means 42, which causes the electrodes to approach each other, when operated, comprises a bore 118 formed in cylinder block 116, a piston 120, and piston rod 122. Bore 118 is connected by conduit 124 to a source of constant fluid pressure (not shown). Piston rod 122 extends beyond block 116 into an aperture 126 formed in spring clamp 128 secured to lever arm 38. When the first motor 42 is energized, rod 122 pushes against spring 130, clamped over recess 132 in lever 38 by apertured plate 128, to cause lever arm 38 to pivot. The deflection and subsequent recovery of spring 130 allows pressure to be maintained between the electrodes 36, 40 during the plastic portion of the weld formation cycle.

Referring now to FIGS. 4 and 5, the second fluid motor means 44, which is used to cause the electrodes to separate, comprises a bore 134 formed in cylinder block 116, a piston 136, and piston rod 138. Return spring 140 is positioned about rod 138 and reacts between a portion of the rod and housing 142 secured to block 116. Fluid pressure is conducted to first passageway 144, formed in block 116, by conduit 146. The sequence controlling means 48 includes second passageway 148, having a spring loaded ball type check valve 150 mounted therein, which connects the aforementioned first passageway 144 to the bore 134. It also includes a third passageway 152, having an adjustable needle valve 154 mounted therein, which connects the bore 134 and the first passageway 144. The second motor piston rod 138 is in contact with the lever arm 38 and when sufficient fluid pressure is applied to the piston 136 to overcome the force generated by that applied to first motor piston 120 it causes the lever arm 38 to pivot affecting the separation of the electrodes 36, 40. The outward movement of lever arm 38 is limited by block mounted adjustable stop 156.

Conduit 146 is connected to conduit 100 through a union 158. Union 158 is connected, in turn, to a source of fluid pressure, not shown, through solenoid valve 46 which comprises the operating means. Solenoid valve 46, energized by control means not shown, governs the application of fluid pressure to the second motor 44 and to the key locking means 32. Deenergization of valve 46 releases the fluid pressure in the bore 98 of the locking means 32 at once, while, as will be explained later, the needle valve 154 and check valve 150 allow the release of fluid pressure from bore 134 of second motor 44 to occur slowly. By adjusting the needle valve, the time separation between occurrence of the release of the dowl pin 102 and the start of electrode movement may be controlled.

Reference will now be made to a typical cycle of operation of the present apparatus, to facilitate a more thorough understanding of the invention. At the start of the cycle welding head 24 is in its raised position having been lifted thereto by arm 89 acting against plate 88. Arm 89 may be a portion of a mechanical or hydraulic system operated in conjunction with the means for delivering the positioned stems and mounts to the welding station. Fluid of a given pressure is applied to first motor 42 through conduit 124. Fluid of an equal or greater pressure is delivered to union 158 through solenoid valve 46 and then to locking means 32 and second motor 44. Due to the greater area of piston 136 of second motor 44 and the difference between the point of contact of the piston rods 132, 138 on lever 38 relative to pivot 112, the same fluid pressure when applied to second motor 44 exerts a greater force thus pivoting the lever 38 to separate welding electrodes 36, 40.

Fluid pressure applied to locking means 32 causes dowl pin 102 to move leg 94 of key 34 against block 96 which thus pivots the frame 38 and shaft 74.

Having established the initial conditions, reference will now be made to FIGS. 7 through 10. A stem 29 having formed lead-in pins 28 extending therefrom and an electrode cage (not shown) having connecting tab 26 are delivered to the welding position beneath head 24 in a substantially aligned condition relative to one another and to the welding head. In mass production of these items certain manufacturing tolerances must be allowed and therefore variations in position are commonplace. This variation is depicted, on an exaggerated scale for purposes of clarity, in FIG. 7.

Timing means, not shown, causes the lifting arm 89 to retract allowing the welding head 24 to descend until stop 86 makes point contact with roller 84. Welding electrodes 36, 40 now straddle the lead 28 and tab 26 (FIG. 8). Fixed electrode 36 is spaced from lead 28 to allow for variation in position and for the relative movement described. At this point in the cycle the timing means, not shown, causes the solenoid valve 46 to shift from the pressure delivery position to a venting position. An immediate effect of the subsequent pressure reduction in union 158 is to free dowl pin 102 of key locking means 32 for movement in bore 98. Therefore frame 30 is now free to pivot from its previous restrained position.

Sequence controlling means 48 becomes operative when the pressure on second motor 44 is released since motor 44 is connected to union 158. Check valve 150 seals second passageway 148 against the escape of pressure so that the entire pressure differential appears across needle valve 154 in the third passageway 152. Valve 154 is adjusted so that the bleed off of pressure occurs at a controlled rate thereby giving a controlled rate of relaxation of second motor 44 or, expressing this movement otherwise, a controlled rate of closure of welding electrodes 36, 40 as the first motor 42 overcomes the second motor 44 causing lever 38 to pivot.

Moving electrode 40 comes in contact with the tab 26 and moves it the closure distance required to produce contact between the tab and lead 28 (FIG. 9). Sufficient resistance to continued movement of electrode 40 is developed by the lead-tab combination so that they now function as a pivot point for the welding electrodes and the entire welding head 24 moves relative thereto. This is possible because of the controlled rate of closure of the electrodes 36 and 40. The force applied to the lead-tab is proportional to the mass of the welding head 24 multiplied by the rate of acceleration of the head using the lead-tab as a pivot. The head must move as the first motor 42 overcomes the second motor 44 since the movable electrode is stopped by the lead-tab. Since the acceleration is relatively slow, as compared to that which would be developed if the pressure on the second motor were released entirely at once, the force developed is correspondingly low so that the head pivots rather than forcibly bending the lead-tab to the fixed electrode position. This moves fixed electrode 36 into contact with the lead-tab to be welded (FIG. 10). Bearings 76 and roller 84 are designed to allow almost frictionless movement of the head relative to the support 20.

At the pressure on the second motor 44 drops the welding pressure between the lead 28 and tab 26 builds up to the proper value for the production of a good joint. Timing means, not shown, causes the welding current, from a source not shown, to flow between the electrodes 36, 40. Contact pressure is maintained during the plastic portion of the weld formation cycle by the recovery of flexed flat spring 130.

After the weld has been completed and has cooled, solenoid valve 46 is operated to return the fluid pressure to second motor 44 and locking means 32. Check valve 150 allows rapid build-up of pressure in bore 134 causing the almost immediate commencement of electrode separation by developing enough force to overcome that applied to the lever 38 by first motor 42. Locking means 32 is energized and dowl pin 102 forces key 34 against block 96 causing head 24 to pivot thus shifting the fixed electrode 36 away from the joined lead-tab. Arm 89 is then operated to lift the head vertically clearing the joined parts so that they can be moved to subsequent stations for additional operations.

The described apparatus is capable of adjusting itself to positional variations of the parts to be joined and is, therefore, extremely useful in conjunction with automated assembly apparatus. Wide range of adjustments which may be made allow the apparatus to be used in producing a variety of products. Safety mechanisms which are provided, as explained, protect the welding head from damage if misaligned units are inadvertently fed to the welding position.

Although one embodiment of the invention has been shown and described, it will be apparent to those skilled in the art that various changes and modifications may be made therein wtihout departing from the scope of the invention as defined by the appended claims.

What is claimed is:

1. In a welding apparatus the combination comprising support; a shaft mounted in said support for reciprocating movement along the longitudinal axis of said shaft and for rotation about said axis; a welder frame secured to one end of said shaft for movement therewith; a stop affixed to the other end of said shaft; a roller mounted on said support for cooperation with said stop to limit axial movement of said shaft; means for reciprocating said shaft; a key secured to said frame; a key lock mounted on said support operable to restrict the movement of said key; a first welding electrode fixedly mounted on said frame; a pivot arm mounted on said frame and movable with respect to said first electrode; a second welding electrode mounted on said pivot arm; first means mounted on said frame for causing said electrodes to approach each other and for applying welding pressure thereto; second means mounted on said frame for overcoming said first means and separating said electrodes; means for operating said second means and said key lock; and means for controlling the sequence in which said key lock and said second means operate whereby said key is released before said electrodes are closed together.

2. In a welding apparatus the combination comprising a support, a shaft mounted in said support for rotation about the longitudinal axis of said shaft, a welder frame secured to one end of said shaft for movement therewith, means for restraining the rotation of said shaft, a first welding electrode fixedly mounted on said frame, a pivot arm mounted on said frame and movable with respect to said first electrode, a pivot arm mounted electrode cooperating with said fixed electrode, first means mounted on said frame for causing said electrodes to approach each other and for applying welding pressure thereto, second means mounted on said frame for overcoming said first means and separating said electrodes, means for operating said second means and said shaft restraining means and means for controlling the sequence in which said restraining means and said second means operate whereby said shaft is released before said electrodes are closed together.

3. In a welding apparatus the combination comprising a support; a shaft mounted on said support for rotation about the longitudinal axis of said shaft; a welder frame secured to one end of the shaft for movement therewith; means for restraining the rotation of said shaft, said shaft restraining means mounted on said support; a lever mounted on said frame; an electrode mounted on said lever; a fixed electrode mounted on said frame cooperating with the lever mounted electrode; an air motor connected to said lever to cause the electrodes to approach each other and a second motor means acting on the lever overcoming the action of the air motor to cause the electrodes to separate from one another; means for operating the shaft restraining means and said second motor means; and means for controlling the sequence in which said restraining means and said second means operates whereby said shaft is free tor otate before said electrodes approach each other.

4. In a welding apparatus the combination comprising a support; a shaft mounted on said support for rotation about the longitudinal axis of said shaft; a welder frame secured to one end of the shaft for movement therewith;

means for restraining the rotation of said shaft, said shaft restraining means mounted on said support; a lever mounted on said frame; an electrode mounted on said lever; a fixed electrode mounted on said frame cooperating with the lever mounted electrode; an air motor connected directly to said lever to cause said electrodes to approach each other; second motor means acting on the lever overcoming the action of the air motor to cause the electrodes to separate from one another; means controlling the relaxation rate of said second motor means; and means for operating said shaft restraining means and said second means whereby said welder frame is free to pivot before said electrodes approach each other.

5. In a welding apparatus the combination comprising; a support, a welder frame pivotally mounted on said support; means for restraining the movement of said frame, said restraining means mounted on said support; a lever arm pivotally mounted on said frame; a welding electrode mounted on said lever arm; a fixed electrode mounted on said frame cooperating with said lever-mounted electrode; first means connected to said lever arm to cause said electrodes to approach each other; second means acting on said lever overcoming the action of said first means to cause the electrodes to separate from one another; means for operating said frame restraining means and said second means; and means for controlling the sequence in which said restraining means and said second means operate whereby said welder frame is free to pivot before said electrodes approach each other.

6. In a welding apparatus the combination comprising a support, a welder frame pivotally mounted on said support; means for restraining the movement of said frame, said restraining means mounted on said support; a lever arm pivotally mounted on said frame; a welding electrode mounted on said lever arm; a fixed electrode mounted on said frame cooperating with said lever-mounted electrode; first means connected to said lever to cause said electrodes to approach each other; second means acting on said lever overcoming the action of said first means to cause the electrodes to separate from one another, said second means including a frame-mounted cylinder having a central bore, a piston movable within said bore, a piston rod connected between said piston and said lever arm, a first passageway formed in said cylinder in communication with a source of fluid pressure, a second passageway in said cylinder connecting said first passageway and said bore, a check valve mounted in said second passageway, a third passageway formed in said cylinder connecting said first passageway and said bore, and adjustable means for controlling the rate of fluid flow mounted in said third passageway; means interconnecting said second means and said restraining means whereby said welder frame is free to pivot before said electrodes approach each other.

7. In a welding apparatus the combination comprising a support, a welder frame pivotally mounted on said support for movement between a remote position and a welding position; means for releasably restraining said frame in said remote position, said restraining means mounted on said support; a lever arm pivotally mounted on said frame; a welding electrode mounted on said lever arm; a fixed electrode mounted on said frame cooperating with said lever-mounted electrode; first means connected to said lever to cause said electrodes to approach each other; second means acting on said lever overcoming the action of said first means to cause the electrodes to separate from one another; means for operating said frame restraining means and said second means; and means for controlling the sequence in which said restraining means and said second means operate whereby said welder frame is free to move to said welding position from remote position before said electrodes approach each other.

8. In an apparatus for welding an electrode to a stem at a welding position the combination comprising a support; a shaft mounted in said support for reciprocating movement along the longitudinal axis of said shaft and for rotation about said axis; a welder frame secured to one end of said shaft for reciprocating movement from a given position to said welding position and for pivotal movement from a remote position to said welding position; a stop affixed to the other end of said shaft; a roller mounted on said support for cooperation with said stop to limit axial movement of said shaft; means for reciprocating said shaft; a key secured to said frame; a key lock mounted on said support operable to releasably retain said frame in said remote position; a first welding electrode fixedly mounted on said frame; a pivot arm mounted on said frame and movable with respect to said first electrode; a second welding electrode mounted on said pivot arm; first means mounted on said frame for causing said electrodes to approach each other and for applying welding pressure thereto; second means mounted on said frame for overcoming said first means and separating said electrodes; said second means including a frame mounted cylinder having a central bore, a piston movable within said bore, a piston rod connected between said piston and said lever arm, a first passageway formed in said cylinder in communication with the exterior thereof, a second passageway in said cylinder connecting said first passageway and said bore, a check valve mounted in said second passageway, a third passageway formed in said cylinder connecting said first passageway and said bore, and an adjustable needle valve mounted in said third passageway; and means for operating said reciprocating means, said keylock and said second means whereby said welder frame is moved from said given position to said welding position and said frame is free to pivot from said remote position to said welding position before said electrodes approach each other.

References Cited in the file of this patent
UNITED STATES PATENTS

| | | |
|---|---|---|
| 1,946,445 | Ragsdale et al. | Feb. 6, 1934 |
| 2,850,619 | Lucia | Sept. 2, 1958 |